United States Patent [19]

Caffarella et al.

[11] 4,146,380
[45] Mar. 27, 1979

[54] METHOD AND APPARATUS FOR SUBDIVIDING A GAS FILLED GLASS TUBE WITH A LASER

[75] Inventors: Thomas E. Caffarella; George J. Radda; David J. Watts, all of Tucson, Ariz.

[73] Assignee: American Atomics Corporation, Tucson, Ariz.

[21] Appl. No.: 811,489

[22] Filed: Jun. 30, 1977

Related U.S. Application Data

[63] Continuation-in-part of Ser. No. 703,809, Jul. 9, 1976, Pat. No. 4,045,201.

[51] Int. Cl.² .............................................. C03B 33/08
[52] U.S. Cl. ........................................ 65/105; 65/112; 65/155; 65/270; 65/271
[58] Field of Search .................... 65/56, 105, 108, 110, 65/112, 155, 270, 271

[56] References Cited

U.S. PATENT DOCUMENTS

| | | | |
|---|---|---|---|
| 2,613,479 | 10/1952 | Stong | 65/108 |
| 3,580,710 | 5/1971 | Britt et al. | 65/109 X |
| 4,045,201 | 8/1977 | Cafarella et al. | 65/105 |

*Primary Examiner*—Arthur D. Kellogg
*Attorney, Agent, or Firm*—Christie, Parker & Hale

[57] ABSTRACT

A focused laser beam is directed at the wide side surface of a long, sealed, gas-filled, glass tube having a longitudinal axis and an elongated cross section. Repeated relative back and forth movement is introduced between the laser beam and the wide surface of the tube transverse to its longitudinal axis to heat and soften the tube along a cut line until the tube divides to form ends and collapses to seal the divided ends. Preferably, the tube is held in fixed position, while the laser beam is scanned across both of its wide side surfaces. The intensity and/or the velocity of the laser beam are modulated. After the tube divides along the cut line, the divided ends are annealed while still in the tube holder by defocusing the laser beam. In one embodiment, plural simultaneous cuts are made by directing a plurality of focused laser beams onto the tube at spaced intervals along its longitudinal axis.

72 Claims, 9 Drawing Figures

METHOD AND APPARATUS FOR SUBDIVIDING A GAS FILLED GLASS TUBE WITH A LASER

CROSS-REFERENCE TO RELATED APPLICATIONS

This application is a continuation-in-part of our co-pending application Ser. No. 703,809, filed July 9, 1976 now U.S. Pat. No. 4,045,201.

BACKGROUND OF THE INVENTION

This invention relates to the manufacture of miniature tubular radioactive light sources and, more particularly, to a method and apparatus for subdividing a long phosphor-coated tube filled with a radioactive gas into a plurality of individual sealed segments.

Self-illuminating devices are known which utilize a glass tube coated on the inside with a phosphor and filled with a radioactive gas such as tritium or Krypton 85. In the manufacture of miniature light sources of this self-illuminating type, it has been the practice to provide a long tube which is coated inside with a luminophor, evacuated, filled with the radioactive gas, and sealed at the ends. The tube is then subdivided into segments by melting the glass, and fusing the glass in the process to seal the ends of the segments. To help form the sealed ends of the tube segments and prevent escape of the radioactive gas, a pressure higher than the gas in the tube is maintained outside the tube. When the glass of the tube melts, it collapses to form the sealed ends. Laser beams have been used to heat the glass tube in the subdividing process. U.S. Pat. Nos. 3,706,543 and 3,817,733 describe arrangements incorporating laser beams for subdividing radioactive gas-filled tubes.

Various problems have been encountered in applying the techniques described in the prior art. In the prior art, the practice has been to hold the tube in two spaced chucks which rotate the tube in the laser beam so that the beam effectively scans the whole perimeter of the tube during the melting process. In practice, it has been found difficult to rotate the two chucks exactly in unison while the cut is completed. Any slight deviation from perfectly uniform rotation tends to stress the tube, i.e., twist it or bend it, which may cause fractures. The larger the cross-sectional dimensions of the tube, the more difficulty is experienced in maintaining perfect alignment and rotation of the tube during the cutting process.

Another problem encountered is that the tube is not easily cut at more than one point at a time, since each segment must be held and rotated in exact alignment with all the other segments during the cutting process so that no stress is placed on the tube. As a result, it has been the practice to only cut one segment at a time, advancing the tube between cuts to provide successive cuts along the length of the tube. As each cut take place, the total volume of the radioactive gas is reduced and therefore the pressure is increased. As each segment is cut off, the pressure in the remaining portion of the tube increases by an incremental amount. Thus, there is a difference in gas pressure between the first segment cut from the tube and the last segment cut from the tube. This results in a nonuniformity of brightness in the successive tube segments. This increase in pressure also requires an adjustment of the outside pressure with each successive cut to maintain the pressure differential necessary to achieve proper collapse and fusion of the tube ends as each new segment is cut. Summary of the Invention A feature of the invention is the modulation of the velocity and/or intensity of the laser beam. In the case of back and forth beam scanning across at least one side of the tube, the velocity of the beam is smaller at the extremities of the beam path than at the middle of the beam path. This transfers more heat to the ends of the tube where there is more glass to be heated. The intensity of the laser beam is also increased during the subdivision of a segment to heat the cut line uniformly to a temperature below the fusion temperature of the tube before division of the tube begins.

Another feature of the invention is a tube holder having a slot in which the long tube slidably fits during its subdivision. The long tube is held in the slot on both sides of the cut line by means that permit the tube to be pushed through the slot by a tube advancing mechanism after each cut. For tubes with a rectangular cross section, the slot preferably has a dove tail cross section.

Another feature of the invention is defocusing the laser beam after the tube divides to anneal and remove discoloration from the divided ends while still in a tube holder, which holds the tube on both sides of the division. This, in effect, eliminates the requirement for a separate annealing and discoloration removal step.

Another feature of the invention is a plurality of focused laser beams simultaneously directed onto a long, sealed, radioactive gas-filled glass tube having a longitudinal axis at spaced intervals along the longitudinal axis. Relative movement is introduced between the laser beams and the tube transverse to the longitudinal axis of the tube to heat and soften the tube along a plurality of cut lines at spaced intervals simultaneously until the tube divides along each cut line to form ends and collapses to seal the divided ends. By thus simultaneously subdividing the long tube into a number of individual sealed segments, such segments are at substantially equal pressure and, therefore, exhibit substantially uniform brightness, the pressure outside the tube does not have to be readjusted during the subdividing process, and less time is required to carry out the process. Furthermore, the beam from a single laser can be split into the plurality of laser beams required for such simultaneous subdivision.

BRIEF DESCRIPTION OF THE DRAWINGS

The features of specific embodiments of the best mode contemplated of carrying out the invention are illustrated in the drawings, in which.

DETAILED DESCRIPTION OF THE SPECIFIC EMBODIMENTS

The entire disclosure of application Ser. No. 703,809, filed on July 9, 1976, is incorporated herein by reference.

Figure 1:
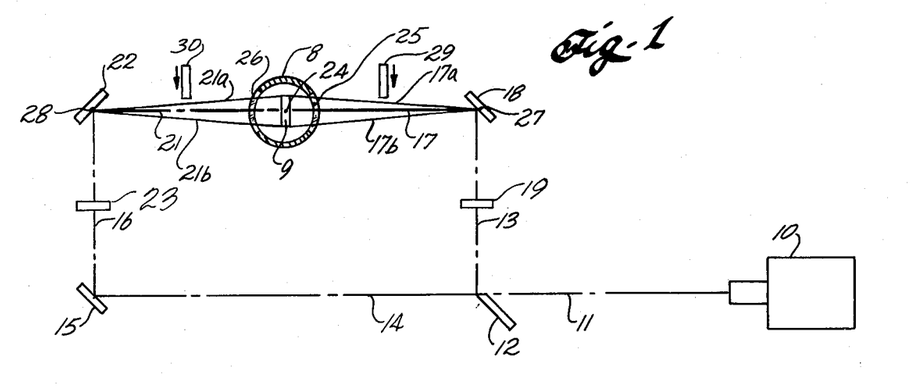
FIG. 1 is a schematic top view of apparatus illustrating the principles of the invention.

The described invention is concerned with a method and apparatus for producing miniature tubular radioactive light sources by subdividing a long, sealed, radioactive gas-filled, glass tube into sealed tube segments without loss of the gas. A long glass tube, typically one to two feet in length, is first coated on its interior surface with a luminophor, i.e., a phosphor compound such as zinc sulfide activated with copper. One end of the long tube is sealed, the tube is evacuated and filled with a radioactive gas, preferably tritium, and then the other end of the tube is sealed to confine the radioactive gas. The pressure of the radioactive gas depends upon the desired illumination, but typically varies from 10 to 40 psia. The long tube preferably has an elongated cross section with two wide sides and two narrow sides. The wide sides provide a large illuminating area for backlighting a liquid crystal display or other objects. Although the elongated cross section of the tube could be oval or oblong, it is preferably rectangular with approximately square corners so the wide sides are as flat as possible. Typically, the tube would be from 0.100 to 0.250 inches wide and from 0.028 to 0.050 inches thick, with a wall thickness from 0.005 to 0.012 inches. To obtain a reliable seal when subdividing the long tube, a rule of thumb is that the sum of the thickness of both wide side walls be equal to or less than the distance between the wide side walls. From the point of view of structural integrity, however, the side walls of the tube must be thick enough to withstand the pressure of the gas within the tube; the wider the tube, the thicker the side walls must be to provide the required structural integrity. As shown in FIG. 1, the long, sealed, phosphor-coated, gas-filled glass tube, designated 9, is loaded into a pressurized cylindrical chamber 8. The pressure of chamber 8 is adjusted to a higher level than the pressure in tube 9. Typically, the pressure difference is between 5 and 10 psi, depending upon the glass characteristics. Tube 9 is then subdivided into individual, sealed tube segments, typically between ½ inch and 1 inch long, by a laser source 10. Laser source 10, which is preferably a $CO_2$ laser operated in the $TEM_{0,0}$ mode at a wavelength of the order to 10.6 microns in the infrared region, emits a light beam 11. A beam splitter 12 divides beam 11 into a beam 13 at right angles to beam 11, and a beam 14 in alignment with beam 11. Beam 14 is deflected by a stationary mirror 15 as a beam 16 at right angles to beam 14. Beam 13 is reflected as a beam 17 by an oscillating mirror 18 of a linear beam scanner. A lens 19 in the path of beam 13 focuses the beam onto one wide side surface of tube 9. Similarly, beam 16 is reflected as a beam 21 by an oscillating mirror 22 of a linear beam scanner. A lens 23 in the path of beam 16 focuses the beam onto the other wide side surface of tube 9. The size of the focused laser beam which is typically between 0.010 and 0.025 inches in diameter, depends upon the wall thickness of the tube, the type of glass of the tube, and the gas pressure within the tube. The longitudinal axis of tube 9, which is perpendicular to the plane of the drawing, is designated 24.

Beams 17 and 21 are aligned with each other in that both lie in the same plane transverse to, and preferably perpendicular to, longitudinal axis 24. Chamber 8 has windows 25 and made of germanium 26 through which beams 17 and 21, respectively, pass to reach the wide side surfaces of tube 9.

The linear scanners are preferably of the moving iron galvanometer type such as, for example, Model ALS-100 manufactured to Bulova Watch Company. As an electrical signal is applied to the linear scanner, the galvanometer is deflected by an amount proportional to the magnitude of the applied signal, and mirrors 18 and 22 oscillate accordingly about axes 27 and 28, respectively. For zero deflection of the linear scanners, mirrors 18 and 22 are oriented so beams 17 and 21 are reflected at a 90° angle from beams 13 and 16, respectively.

As the linear beam scanners are deflected positively and negatively about the zero deflection point, mirrors 18 and 22 oscillate and beams 17 and 21 scan across the wide side surfaces of tube 9 perpendicular to axis 24. The extremities of the beam scans are represented by lines 17a and 17b and lines 21a and 21b. Beams 17 and 21 repeatedly scan back and forth across the wide side surfaces of tube 9 along a cut line transverse to and preferably perpendicular to longitudinal axis 24 to heat and soften tube 9 until tube 9 divides to form ends and collapses to seal the divided ends. Typically, the scanning frequency is from 6 to 10 Hertz, depending upon the variables, i.e., the type of glass, the gas pressure, and the tube dimensions. The higher pressure in chamber 20 than the gas pressure in tube 9 causes tube 9 to collapse along the cut line to form a reliable seal without appreciable loss of gas from within tube 9.

After the divided ends of tube 9 are sealed, a lens 29 is inserted into the path of beam 17 between chamber 8 and lens 19, and a lens 30 is inserted into the path of beam 21 between chamber 8 and lens 23 to defocus beams 17 and 21.

Alternately, lenses 29 and 30 could be inserted into the paths of beams 13 through 16, respectively. The defocused beams increase in size to impinge on the sealed ends and decrease in intensity to reduce the glass temperature. During the subdivision of tube 9 by the laser beams, the glass is discolored, i.e., blackened, by a chemical reaction between the tritium and the constituents of the glass. Defocused beams 17 and 21 scan back and forth several times across the sealed ends of tube 9, while still in its tube holder described below in connection with FIGS. 2A, 2B, and 2C, to anneal the glass of the sealed ends and remove the discoloration. The time and temperature of annealing depends upon the type of glass, and can be readily ascertained from published reference data on such glass types.

Although the preferred embodiment is to hold the long tube stationary and to move the laser beam, an alternative embodiment is to move the long tube, while holding the laser beam stationary. The movement of the tube in this alternative embodiment, however, may give rise to stresses, which might weaken or fracture the tube, and complicates the design of the equipment for automatic axial advancement of the tube after subdivision of each tube segment.

Figure 2A:
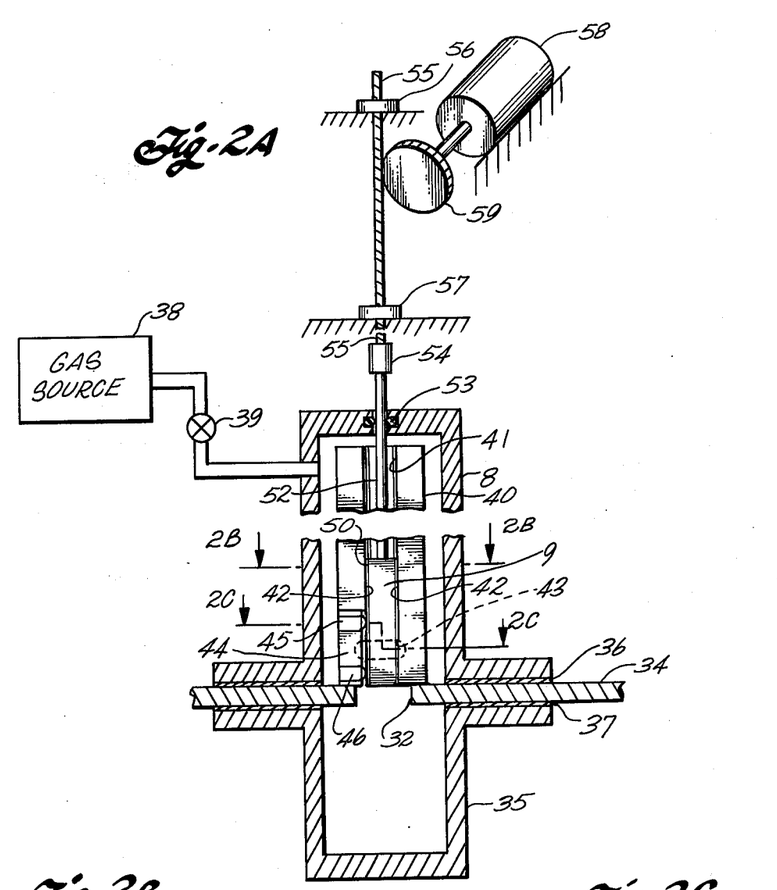
FIGS. 2A, 2B, and 2C are a side sectional view, a top sectional view through the plane designated 2B—2B, and a top sectional view through the plane designated 2C—2C, respectively, of the pressurized chamber depicted schematically in FIG. 1.
Figure 2B:
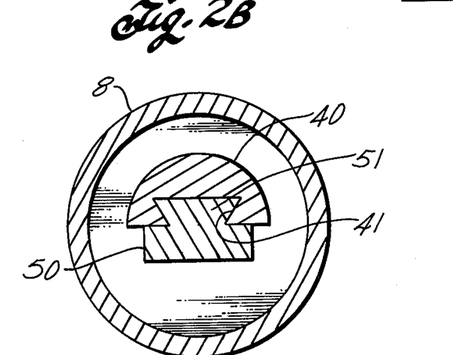
Figure 2C:
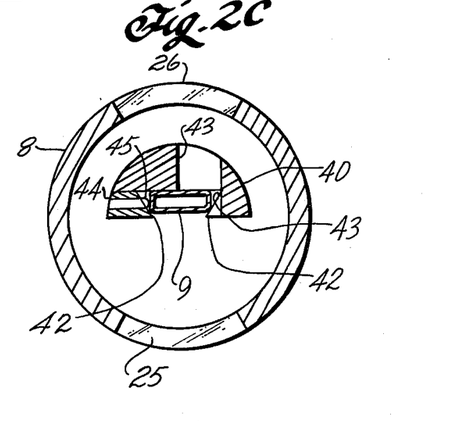

As shown in FIGS. 2A, 2B, and 2C, chamber 8 is attached to the top of a platform 34 by means not shown, and a cylindrical collector 35 for the tube segments produced by the described method is attached to the bottom of platform 34 by means not shown. Chamber 8 and collector 35 are connected by a hole 32 in platform 34. An annular seal 36 is disposed between chamber 8 and platform 34, and an annular seal 37 is disposed between collector 35 and platform 34. A source of gas 38 is supplied through valve 39 to the interior of chamber 8 to provide the desired pressure therein. Valve 39 is a 3-way valve having an exhaust port that permits exhaust of the gas from chamber 8. A tube holder 40 of hemicylindrical form is fixed within chamber 8 by means not shown. Tube holder 40 has a vertical elongated slot 41 with a dovetailed cross section designed to receive tube 9. Slot 41 is open along one side to form an open side between edges 42 and a closed side opposite the open side that is wider than the open side. The open side is several thousandths of an inch narrower than the width of tube 9, the closed side is several thousandths of an inch wider than tube 9, and the depth of slot 41 is several thousandths of an inch larger than the thickness of tube 9. As a result, tube 9 is retained by slot 41 but free to slide vertically through slot 41. Tube holder 40 has an opening 43 that passes competely through tube holder 40 in the region where the laser beams, i.e., beams 17 and 21, impinge upon the wide side surfaces of tube 9. Opening 43 is slightly wider than tube 9 so the laser beams do not touch tube holder 40. Tube holder 40 could be milled from aluminum bar stock. A portion of the bottom of tube holder 40 adjacent to one edge 42 of slot 41 is cut away for placement of a mounting block 44 which is attached to tube holder 40 by fasteners not shown. Ball plungers 45 and 46, which are mounted in bores in mounting block 44, each have a spring loaded ball that urges the adjacent short side surface of tube 9 toward the opposite slanting end of slot 41, thereby holding tube 9 in two spaced apart positions, namely, at one position above opening 43 and at one position below opening 43. The spring pressure of ball plungers 45 and 46 is not so great as to inhibit the vertical movement of tube 9 through slot 41 on application of a vertical force to tube 9. By way of example, ball plungers 45 and 46 could be Part No. CL-15-SBP-1 of Carr Lane Manufacturing Company, St. Louis, Missouri.

A slider 50, which could also be milled from aluminum bar stock, has a tongue 51 with a dovetailed cross section matching that of slot 41. One end of a rod 52 is attached to slider 50. Rod 52 extends vertically upward from slider 50 through an O-ring seal 53 in the top of chamber 8. Above chamber 8 the other end of rod 52 is attached to a connecting block 54. A lead screw 55 passes through stationary supporting blocks 56 and 57, which have threads engaging the threads of lead screw 55. The lower end of lead screw 55 is attached to connecting block 54. A stepping motor 58 drives a gear 59 having teeth that engage the threads of lead screw 55. Thus, as motor 58 operates, gear 59 rotates to translate lead screw 55 in a vertical direction and drive slider 50 through slot 41 of tube holder 40. By way of example, the function of lead screw 55, supporting blocks 56 and 57, and gear 59 could be provided by a unislide motor drive assembly, Part No. B2515P10J of Velmex, Inc., East Bloomfield, New York, and the function of motor 58 could be provided by Part No. M092FD08 of Superior Electric Company, Bristol, Connecticut. After each subdivision of tube 9 by the laser beams in the region of opening 43, ball plunger 46 holds the resulting tube segment, and ball plunger 45 holds the remainder of tube 9 until motor 58 drives slider 50 downwardly an increment equal to the length of the resulting tube segment. This pushes the resulting tube segment downwardly through hole 32 into collector 39, and pushes the remainder of tube 9 downwardly to the position for the next subdivision.

Figure 3:
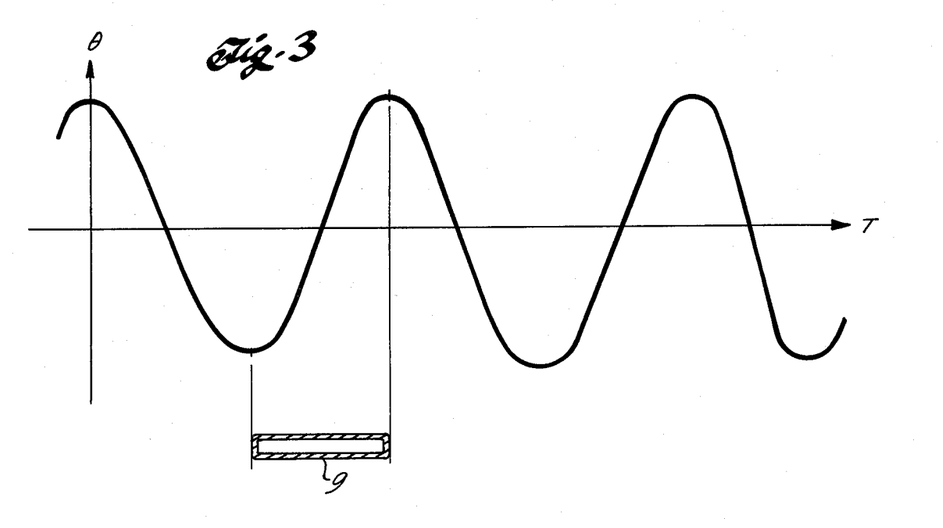
FIG. 3 is a graph representing the angular position of the reflector of one of the linear scanners depicted in FIG. 1 as a function of time.

The velocity and/or intensity of laser beams 17 and 21 are preferably modulated during the process of subdividing tube 9 into individual segments. The velocity of the laser beams scanning across the wide side surfaces of the long tube is preferably modulated so the scanning velocity is lower at the extremities of the beam scans than at the middle of the beam scans. This is accomplished by applying a sinusoidal signal to the linear scanners to produce a sinusoidal oscillation of mirrors 18 and 22. As represented in FIG. 3, the angular position, $\theta$, of each of mirrors 18 and 22 varies sinusoidally as a function of time, T. Typically, $\theta$ is of the order to two or three degrees. Tube 9 is shown in cross section in FIG. 3 in its proper position relative to the angular position of mirrors 18 and 22. As depicted, the rate of change of the angular position, $\theta$, i.e., the scanning velocity of beams 17 and 21 is zero at the edges of the wide side surfaces of tube 9 and increases to a maximum at the center thereof. Such modulation of the scanning velocity of beams 17 and 21 results in greater heat transfer of the beam energy to the glass at the edges of the wide side surfaces where more glass is present, namely, the glass forming the narrow sides of tube 9. This provides more uniform heating along the entire cut line and, therefore, produces a more reliable seal.

In addition to the described modulation of the scanning velocity, it is also preferable to modulate the intensity of beams 17 and 21 during each cutting cycle, i.e., each division of tube 9 into individual sealed segments. The desideratum is first to uniformly preheat tube 9 along the cut line to a temperature below the fusion temperature, i.e., melting temperature, of the glass in a large number of beam scans, and then to heat the glass along the cut line to a temperature above the fusion temperature in one, two, or a few beam scans to form the sealed ends. The slow preheating step minimizes glass stresses, and accordingly produces a more reliable seal. The rapid final heating step improves the glass distribution at the sealed ends, thereby further improving the reliability of the seal. The pattern of the intensity modulation depends upon the type of glass of the tube, the gas pressure in the tube, and the tube dimensions.

Figure 4A:
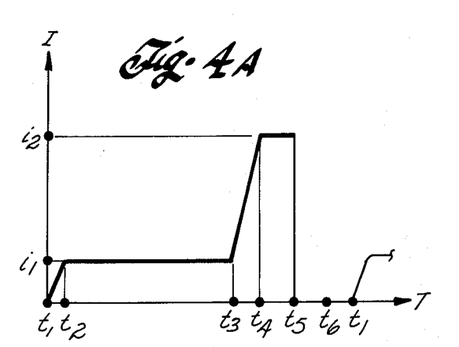
FIGS. 4A and 4B are graphs representing modulation patterns of the beam intensity of the laser source depicted in FIG. 1 as a function of time.

An exemplary intensity modulation pattern which is particularly effective for tubes having a width in the order of 0.180 inches is illustrated in FIG. 4A. FIG. 4A is a graph of beam intensity, I, as a function of time, T, which designates specific values of beam intensity, $i_1$ and $i_2$, and specific values of time, $t_1$ through $t_7$. The cycle begins at $t_1$ with zero beam intensity, i.e., no beam. From $t_1$ to $t_2$, the beam increases in intensity to an intermediate value of $i_1$. Typically, the interval between $t_2$ and $t_1$ is of the order of a second or less, and $i_1$ is of the order of 4 to 8 watts. The beam intensity remains at $i_1$ until time $t_3$, during which the glass is preheated. Typically, the interval between $t_3$ and $t_2$ is of the order of 3 to 4 seconds. The beam intensity increases rapidly between $t_3$ and $t_4$ to a high value of $i_2$. Typically, the interval between $t_4$ and $t_3$ is of the order of a second or less, and $i_2$ is of the order of 28 to 30 watts. The beam intensity remains at $i_2$ from $t_4$ to $t_5$, which is the time interval required to divide and seal the ends of the tube and to anneal the tube, typically of the order of one or two seconds. During the interval between $t_4$ and $T_5$, after the tube is subdivided and its ends are sealed, the laser beams are defocused to anneal the sealed ends and remove the discoloration. At $t_5$ the laser beam is turned off. In the interval between $t_5$ and $t_6$, the sealed ends of the tube cool off sufficiently so they will not fuse upon contact. At $t_6$ the long tube is advanced axially until the next cut line perpendicular to longitudinal axis 24 is aligned with beams 17 and 21, while the newly formed sealed end of the long tube pushes the newly formed individual tube segment from the tube holder into collector 35 (FIG. 2A). At $t_1$ the described cutting cycle repeats. The period of the described cutting cycle, i.e., the interval between successive occurrences of $t_1$ on the graph is of the order of 7 seconds.

Figure 4B:
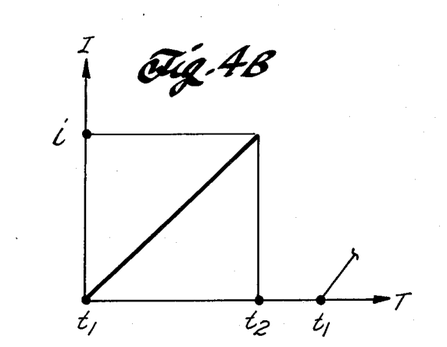

In the case of a long tube having a width of 0.250 inches, the modulation pattern illustrated in FIG. 4B is particularly effective. The beam intensity rises continuously and at a constant rate from zero at $t_1$ to a value of i at $t_2$ to first preheat the glass of the long tube along the cut line and then divide and seal its ends in a few beam scans. Typically, i would be between 28 and 30 watts and the time interval between $t_2$ and $t_1$ would be 5 to 6 seconds. During the interval from $t_2$ to $t_1$, the sealed ends of the tube are annealed, if desired, and after cooling the sealed ends, the long tube is axially advanced.

Figure 5:
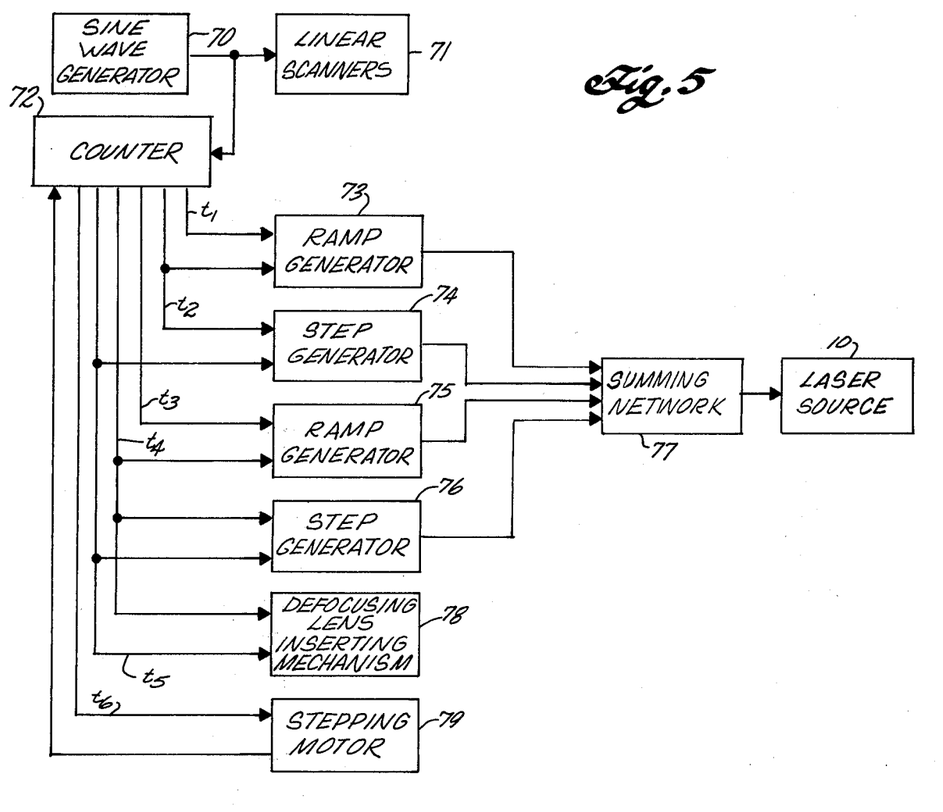
FIG. 5 is a schematic block diagram of the circuitry for controlling the tube cutting cycle, including the beam intensity of the laser source and the mirror deflection of the linear scanners depicted in FIG. 1.

Reference is made to FIG. 5 for circuitry that automatically controls the described process of subdividing tube 9 into individual sealed tube segments using the intensity modulation pattern of FIG. 4A. A sine wave generator 70 producing an output signal identical to the waveform shown in FIG. 3 at a frequency from 6 to 10 Hertz is connected to the linear scanners of which mirrors 18 and 22 are a part, designated 71 in FIG. 5. Sine wave generator 70 is also connected to a counter 72, which controls the timing of the intensity modulation, beam defocusing, and axial advancement of tube 9. Thus, the timing of these operations is synchronized to the beam scanning. In particular, it is desirable to have the beam scans and changes in intensity start and stop at the edges of the wide side surfaces. To this end, the state of counter 72 advances responsive to each positive peak of the output of sine wave generator 70. If the frequency of the output of sine wave generator 70 is 6 Hertz and the period of the cycle for producing individual tube segments is 7 seconds, counter 72 would have 42 states and would comprise 6 binary stages. Depending upon the desired timing, different states of counter 72 are assigned to $t_1$, $t_2$, $t_3$, $t_4$, $t_5$, and $t_6$. At $t_1$, counter 72 triggers a ramp generator 73. At $t_2$, counter 72 triggers a step generator 74 and turns ramp generator 73 off. At $t_3$, counter 72 triggers a ramp generator 75. At $t_4$, counter 72 triggers a step generator 76 and turns ramp generator 75 off. At $t_5$, counter 72 turns step generator 76 off. The outputs of ramp generators 73 and 75 and step generators 74 and 76 are applied to a summing network 77. The output of summing network 77, which duplicates the modulation pattern shown in FIG. 4A, is applied to laser source 10 of FIG. 1 to adjust its bias current, thereby controlling the intensity of the beam emitted thereby. Assuming that the ends of the long tube are divided and sealed by the time the beam intensity reaches $i_2$, counter 72 also actuates defocusing lens inserting mechanisms 78 at $t_4$. Each of mechanisms 78 is a conventional solenoid actuated, translatable shuttle that supports one of defocusing lens 29 and 30. Mechanisms 78 translate in one direction at $t_4$ to insert the defocusing lenses carried by mechanisms into the laser beam path. At $t_5$, mechanisms 78 translate in the other direction to remove the defocusing lenses from the laser beam path. Alternatively, mechanisms 78 could be actuated at a point in time between $t_4$ and $t_5$. At $t_6$, counter 72 actuates stepping motor 58 to axially advance tube 9 until the next cut line is aligned with beams 17 and 21. After advancement of tube 9, stepping motor 79 emits a pulse, which is applied to counter 72 to reset it. Thereupon, counter 72 begins to advance once again through its states repeating the cycle.

Figure 6:
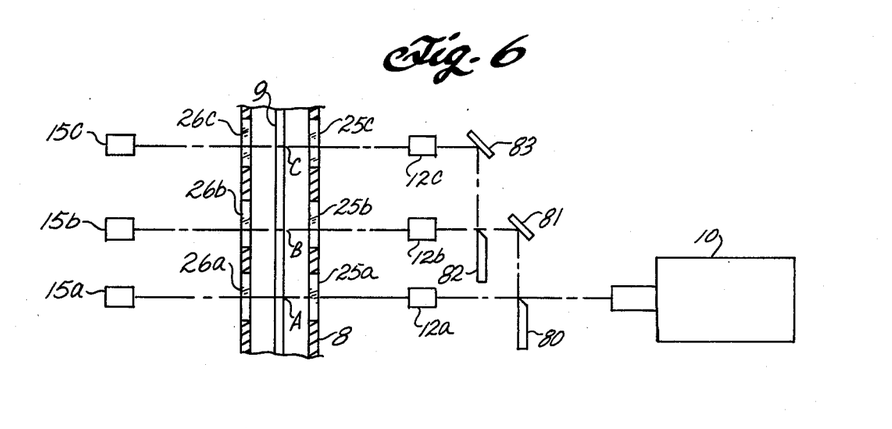
FIG. 6 is a schematic side view of apparatus for simultaneously subdividing a long tube into a plurality of segments according to the principles of the invention.

Reference is made to FIG. 6 for a schematic side view of an embodiment of the invention, in which tube 9 is simultaneously divided along a plurality of cut lines. The beam emitted by laser source 10 is divided by a beam splitter 80. A portion of the beam continues to travel horizontally and is directed as shown in FIG. 1 onto both wide side surfaces of tube 9 along a cut line designated A. Another portion of the beam travels vertically and is reflected from a stationary mirror 81 to a horizontal plane lying above cut line A. This portion is divided by a beam splitter 82. A portion of the beam continues to travel horizontally and is directed as shown in FIG. 1 onto both wide side surfaces of tube 9 along a cut line designated B. Another portion of the beam travels vertically and is reflected from a stationary mirror 83 to a horizontal plane lying above cut line B. This portion of the beam continues to travel horizontally and is directed as shown in FIG. 1 onto both wide side surfaces of tube 9 along a cut line designated C. The beams directed onto both wide side surfaces of tube 9 along cut lines A, B, and C repeatedly scan back and forth across the wide side surfaces of tube 9 simultaneously to heat and soften tube 9 until tube 9 divides to form ends along each cut line and collapses to seal the divided ends. Thus, a number of subdivisions of tube 9 are made simultaneously with a single laser source. The individual tube segments resulting from such subdivisions are at substantially equal pressure and, therefore, exhibit substantially uniform brightness. Furthermore, the pressure in chamber 8 does not have to be readjusted during the subdividing process.

With reference to FIGS. 2A, 2B, and 2C, the embodiment of FIG. 6 would have a tube holder with a pair of ball plungers, such as ball plungers 45 and 46, for each cut line and a slot, such as slot 43. Otherwise, the description of FIGS. 2A, 2B, and 2C is applicable to the embodiment of FIG. 6. After the plural simultaneous cuts are made by the laser beams, slider 50 pushes all the resulting tube segments and the remainder of tube 9 downwardly in tandem to dump the resulting tube segments one after the other into collector 35 and to position the remainder of tube 9 for the next plurality of cuts. Alternatively, if the entire length of tube 9 is to be cut simultaneously, slider 50 as well as the described apparatus for driving it could be eliminated.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention as set forth in the following claims. For example, with a stationary long tube the invention contemplates other types of laser beam movement than a back and forth scan. The invention also contemplates defocusing the laser beam to anneal the sealed ends, directing a plurality of laser beams simultaneously at spaced apart intervals along the longitudinal axis of the long tube to effect multiple subdivisions, and beam intensity modulation to slowly preheat and rapidly divide the long tube independent of the nature of the relative movement between the laser beam and the long tube during the subdividing process. Instead of modulating the beam velocity to transfer more heat to the edges of the wide side surfaces of the long tube, the same result could be achieved by modulating the beam intensity. If the radioactive gas pressure in the long tube is less than 14.7 psia, the long tube can be subdivided without a pressurized chamber. It may also be possible to cut tubes having a circular cross section with a back and forth scan if the velocity of the beam scan is modulated to uniformly heat the perimeter of the cut line.

Reference is made to application Ser. No. 916,936, filed June 19, 1978, for a continuation-in-part of the present application which claims subject matter disclosed in the present application.

What is claimed is:

1. A method of subdividing into individual sealed segments a long, sealed glass tube coated on the inside with a luminophor and filled with a radioactive gas, the tube having a longitudinal axis and an elongated cross section with a wide side surface, the method comprising the steps of:
    directing a laser beam at the wide side surface of the tube in an ambient atmosphere having a higher pressure than the gas in the tube;
    introducing repeated relative back and forth movement between the laser beam and the wide side surface of the tube transverse to the longitudinal axis of the tube to heat and soften the tube along a cut line until the tube divides to form ends and collapses to seal the divided ends; and
    annealing the sealed ends with the laser beam after division by reducing the intensity of the beam.

2. The method of claim 1, additionally comprising the step of increasing the intensity of the laser beam during the relative movement.

3. The method of claim 1, in which the relative movement between the laser beam and the tube across the wide side surface is sinusoidal, the velocity of the relative movement being maximum at the middle of the wide side surface and decreasing toward the edges of the wide side surface.

4. The method of claim 3, in which the step of introducing relative movement between the laser beam and the tube comprises holding the tube stationary and moving the laser beam.

5. The method of claim 1, in which the tube has a second wide side surface opposite the first named wide side surface, the method additionally comprising the steps of:
    directing a second laser beam at the second wide side surface of the tube; and
    introducing repeated relative back and forth movement between the second laser beam and the second wide side surface of the tube transverse to the longitudinal axis of the tube in alignment with the first named laser beam to heat and soften the tube along the cut line until the tube divides to form ends and collapses to seal the divided ends.

6. A method of producing miniature tubular radioactive light sources by subdividing into individual sealed segments a long, sealed glass tube filled with a radioactive gas, the tube having a longitudinal axis, the method comprising the steps of simultaneously:
    holding a long glass tube in a stationary position in an ambient atmosphere having a higher pressure than the gas in the tube;
    moving a laser beam across the surface of the long glass tube along a cut line transverse to the longitudinal axis of the tube to heat and soften the tube until the tube divides to form ends and collapses to seal the divided ends; and
    decreasing the intensity of the laser beam to anneal the divided ends.

7. The method of claim 6, additionally comprising the step of increasing the intensity of the laser beam while moving the laser beam across the surface of the tube.

8. A method of subdividing into individual sealed segments a long, sealed glass tube coated on the inside with a luminophor and filled with a radioactive gas, the tube having a longitudinal axis, the method comprising the steps of simultaneously:
    directing a plurality of laser beams onto the tube at spaced intervals along the longitudinal axis in an ambient atmosphere having a higher pressure than the gas in the tube; and
    introducing relative movement between the laser beams and the tube across the surface of the tube transverse to the longitudinal axis of the tube to heat and soften the tube simultaneously along a plurality of cut lines at the spaced intervals until the tube divides along each cut line to form ends and collapses to seal the divided ends.

9. The method of claim 8, in which the step of introducing relative movement between the laser beams and the tube comprises holding the tube in a stationary position and moving the laser beams across the surface of the tube.

10. The method of claim 9, in which the tube has an elongated cross section with a wide side surface, and the step of moving the laser beams across the surface of the tube comprises scanning the laser beams back and forth across the wide side surface of the tube.

11. The method of claim 10, in which the beams are scanned back and forth across the tube sinusoidally with a maximum velocity at the middle of the wide side surface of the tube and decreasing the velocity toward the edges of the wide side surface of the tube.

12. The method of claim 8, additionally comprising the step of annealing the divided ends with the plurality of laser beams after division.

13. The method of claim 8, additionally comprising the step of increasing the intensity of the laser beam during the relative movement.

14. A method of subdividing into individual sealed segments a long, sealed glass tube coated on the inside with a luminophor and filled with a radioactive gas, the tube having a longitudinal axis, the method comprising the steps of:
    directing a focused laser beam at the tube in an ambient atmosphere having a higher pressure than the gas in the tube;
    introducing relative movement between the laser beam and the tube transverse to the longitudinal axis of the tube to heat and soften the tube along a cut line until the tube divides to form ends and collapses to seal the divided ends; and
    increasing the intensity of the laser beam during the relative movement to preheat the cut line uniformly to a temperature below the fusion temperature of the tube before division of the tube begins.

15. The method of claim 14, in which the intensity increasing step increases the intensity of the laser beam continuously during the movement step.

16. The method of claim 15, in which the intensity increasing step increases the intensity of the laser beam at a constant rate during the movement step.

17. The method of claim 14, in which the intensity increasing step comprises in the order recited, increasing the intensity of the laser beam to an intermediate level, holding the intensity of the laser beam constant at the intermediate level to preheat the cut line uniformly to a temperature below the fusion temperature of the tube, and further increasing the intensity of the laser beam to a high level to divide rapidly the tube to form the sealed ends.

18. The method of claim 14, in which the tube has an elongated cross section with a wide side surface, and the step of introducing relative movement between the laser beam and the tube comprises holding the tube in a stationary position and repeatedly scanning the laser beam back and forth across the wide side surface of the tube.

19. The method of claim 18, additionally comprising the step of modulating the velocity of the scanning beam to increase moving from the edges of the wide side surface toward the center of the wide side surface and to decrease moving from the center of the wide side surface toward the edges of the wide side surface.

20. The method of claim 18, in which the holding step comprises holding the tube at two spaced apart positions along the longitudinal axis on opposite sides of the laser beam, the method additionally comprising the steps of:
   defocusing the laser beam after formation of the sealed ends to impinge upon the sealed ends; and
   introducing relative movement between the laser beam and the tube transverse to the longitudinal axis of the tube during the defocusing step until the sealed ends of the tube are annealed.

21. The method of claim 14, in which the introducing step introduces repeated relative back and forth movement between the laser beam and the tube.

22. The method of claim 21, in which the step of introducing repeated relative back and forth movement between the laser beam and the tube comprises holding the tube stationary and moving the laser beam.

23. The method of claim 14, in which the step of introducing relative movement between the laser beam and the tube comprises holding the tube stationary and moving the laser beam.

24. A method of subdividing into individual sealed segments a long, sealed glass tube coated on the inside with a luminophor and filled with a radioactive gas, the tube having a longitudinal axis, the method comprising the steps of:
   directing a laser beam at the tube in an ambient atmosphere having a higher pressure than the gas in the tube;
   introducing relative movement between the laser beam and the tube transverse to the longitudinal axis of the tube to heat and soften the tube along a cut line until the tube divides to form ends and collapses to seal the divided ends; and
   changing the velocity of the relative movement between the laser beam and the tube to uniformly heat the glass along the cut line.

25. The method of claim 24, in which the step of introducing relative movement between the laser beam and the tube introduces repeated relative back and forth movement between the laser beam and one side of the tube to define a scan path, and the step of changing the velocity of the relative movement increases the velocity of the relative movement moving from the edges of the scan path toward the middle of the scan path, and decreases the velocity of the relative movement moving from the middle of the scan path toward the edges of the scan path.

26. The method of claim 24, in which the step of changing the velocity of the relative movement comprises introducing repeated sinusoidal back and forth movement.

27. The method of claim 24, in which the introducing step comprises introducing repeated relative back and forth movement between the laser beam and the tube.

28. The method of claim 27, in which the step of introducing repeated relative back and forth movement between the laser beam and the tube comprises holding the tube stationary and moving the laser beam.

29. The method of claim 24, in which the step of introducing relative movement between the laser beam and the tube comprises holding the tube stationary and moving the laser beam.

30. A method of subdividing into individual sealed segments a long, sealed glass tube coated on the inside with a luminophor and filled with a radioactive gas, the tube having a longitudinal axis, the method comprising the steps of:
   holding the tube at two spaced apart positions along the longitudinal axis;
   directing a laser beam at the tube between the holding positions in an ambient atmosphere having a higher pressure than the gas in the tube;
   introducing relative movement between the laser beam and the tube transverse to the longitudinal axis of the tube;
   focusing the laser beam during an initial portion of the moving step to heat and soften the tube along a cut line until the tube divides to form ends and collapses to seal the divided ends; and
   defocusing the laser beam during a final portion of the moving step of anneal the divided ends of the tube.

31. The method of claim 30, in which the holding step holds the tube in a stationary position.

32. The method of claim 30, in which the tube has an elongated cross section with a wide side surface and the step of introducing relative movement between the laser beam and the tube comprises introducing repeated back and forth relative movement across the wide side surface.

33. The method of claim 32, additionally comprising the step of modulating the velocity of the relative movement between the laser beam and the wide side surface of the tube.

34. In combination with apparatus for subdividing a long radioactive gas-filled sealed glass tube into individual sealed tube segments by means of a laser beam, a holder for the long tube comprising:
   a body having an elongated slot in which the tube slidably fits;
   means for permitting the laser beam to pass through the body to the slot in the region where the long tube is to be subdivided;
   means for holding the long tube on both sides of the region where it is to be subdivided; and
   means for pushing the long tube through the slot.

35. The combination of claim 34, in which the tube has a rectangular cross section with a width and a thickness, the slot in open along one side to form an open side and a closed side opposite the open side that is wider than the open side, the width of the tube being narrower than the closed side and wider than the open side, and the thickness of the tube being smaller than the depth of the slot.

36. The combination of claim 35, in which the means for permitting the laser beam to pass through the body to the tube comprises an opening through the body to the closed side of the slot.

37. The combination of claim 36, in which the holding means comprises first and second ball plungers on one end of the slot between the open side and the closed side of the slot to urge the tube toward the opposite end of the slot.

38. The combination of claim 37, in which the sliding means comprises a body having a tongue with a cross section matching that of the slot, the tongue being slidable in the slot.

39. A laser glass working system comprising:
  a laser source that emits a laser beam;
  a work station remote from the laser source, the work station including a tube holder for holding an elongated glass tube having two flat oppositely disposed side surfaces, the holder having laser access opening means exposing the flat side surfaces of the tube along a region of its length;
  means for splitting the beam emitted by the laser source into two parts;
  means for directing the two parts of the beam at the work station from opposite directions so the two parts of the beam directed at the work station from opposite directions pass through the laser access opening means; and
  means for scanning the two parts of the beam directed at the work station back and forth in the same plane.

40. The system of claim 39, in which the scanning means comprises a galvanometer controlled oscillating mirror in the path of each part of the beam, the mirror being deflected by an amount dependent upon the magnitude of the signal applied to a galvanometer, a single source of an oscillating signal, and means for applying the oscillating signal from the single source to both galvanometers for deflecting the mirrors.

41. The system of claim 40, additionally comprising a lens for focusing each part of the beam at the work station.

42. The system of claim 41, in which the beam splitting means comprises a beam splitter and a stationary mirror oriented to direct the two parts of the beam parallel to each other on opposite sides of the work station and the oscillating mirrors lie in the parallel paths of the two parts to intercept the two parts and direct them at the work station from opposite directions.

43. The system of claim 42, in which the lenses are located between the beam splitter and the stationarymirror on the one hand and the oscillating mirrors on the other hand in the parallel paths of the two parts of the beam.

44. The system of claim 39, in which the work station additionally includes means for incrementally moving the tube longitudinally in the holder, the moving means being operative during a first time period in which the tube is moving and bein inoperative during a second time period in which the tube in stationary.

45. The system of claim 44, additionally comprising means for preventing laser energy from impinging upon the tube during the first period, the laser energy being free to impinge upon the tube during the second period.

46. The apparatus of claim 39, in which the work station additionally includes a sealed chamber enclosing the tube holder and means for pressurizing the sealed chamber.

47. A laser working system for cutting along glass tubes at a work station, the system comprising:
  a laser source that emits a laser beam of variable intensity, remote from the work station;
  a glass tube holder at the work station;
  means for directing the laser beam at the tube holder;
  a source of a periodic signal;
  means responsive to the periodic signal for producing a corresponding periodic relative movement between the tube holder and the laser beam directed at the tube holder; and
  means responsive to the periodic signal for varying the intensity of the laser beam to synchronize the laser beam intensity variations to the relative movement between the laser beam and the tube holder.

48. The system of claim 47, in which the source of periodic signals is an electrical sine wave generator.

49. The system of claim 48, in which the means for introducing relative movement between the tube holder and the laser beam comprises means for introducing repeated relative back and forth movement between the laser beam and the tube holder.

50. The system of claim 49, in which the tube holder is fixed to the work station, and the means for introducing relative back and forth movement comprises means for deflecting the laser beam directed at the tube holder back and forth across the tube holder.

51. The system of claim 50, in which the means for varying the intensity of the laser beam rises the intensity of the laser beam continuously at a constant rate during a time interval equal to a given number of cycles of the periodic signal.

52. The system of claim 50, in which the means for varying the intensity of the laser beam rises the intensity of the laser beam from a low value to an intermediate value, maintains the intensity of the laser beam at the intermediate value for a time interval equal to a given number of cycles of the periodic signal, and raises the intensity of the laser beam from the intermediate value to a high value at the end of the time interval.

53. The system of claim 52, in which the means for varying the intensity of the laser beam maintains the intensity of the laser beam at the high value for a time interval equal to a given number of cycles of the periodic signal.

54. The system of claim 47, in which the tube holder is fixed to the work station, and the means for introducing relative back and forth movement comprises means for deflecting the laser beam directed at the tube holder back and forth across the tube holder.

55. A laser glass working system comprising:
  a laser source that emits a laser beam;
  a work station remote from the laser source adapted to hold a glass tube;
  means for splitting the beam emitted by the laser source into two parts;
  means for directing the two parts of the beam at the work station from opposite directions;
  means for scanning the two parts of the beam directed at the work station back and forth in the same plane; and means for modulating the intensity of the laser beam emitted by the laser source in increasing fashion while scanning the two parts of the beam back and forth to first heat slowly and then cut rapidly the tube at the work station.

56. The system of claim 1, in which the modulating means comprises means for increasing the intensity of the laser beam at a constant rate while scanning.

57. The system of claim 55, in which the modulating means comprises means while scanning for increasing the intensity of the laser beam to an intermediate level, means for holding the intensity of the laser beam constant at the intermediate level to slowly heat the tube, and means for increasing the intensity of the laser beam to a high level to cut rapidly the tube.

58. The system to claim 55, in which the scanning means deflect the two parts of the beam back and forth responsive to an electrical signal, the system additionally comprising a source of a periodic electrical signal, means for applying the periodic electrical signal to the scanning means to deflect the two parts of the beam accordingly, and means for applying the periodic electrical signal to the modulating means to synchronize the modulation to the periodic electrical signal.

59. A laser working system comprising:
a laser source that emits a lase beam;
a work station remote from the laser source;
means for splitting the beam emitted by the laser source into two parts;
means including deflector means for directing the two parts of the beam at the work station from opposite directions for movement in the same plane;
a source of an electrical sine wave signal; and
means responsive to the source of the electrical signal for controlling the deflector means to deflect the two parts of the beam directed at the work station back and forth in the same plane sinusoidally.

60. The method of claim 10, in which the tube has a second wide side surface opposite the first named wide side surface, the method additionally comprising the step of:
directing a second plurality of focused-laser beams at the second wide side surface of the tube at spaced intervals along the longitudinal axis; and
introducing repeated relative back and forth movement between the second plurality of laser beams and the second wide side surface of the tube transverse to the longitudinal axis of the tube in alignment with the first named plurality of laser beams to heat and soften the tube along the cut lines until the tube divides to form ends and collapses to seal the divided ends.

61. The method of claim 6, additionally comprising the steps of advancing the tube axially relative to the laser beam and repeating the directing, introducing, and annealing steps.

62. The method of claim 8, additionally comprising the steps of advancing the tube axially relative to the laser beam and repeating the directing and introducing steps.

63. The method of claim 14, additionally comprising the steps of advancing the tube axially relative to the laser beam and repeating the directing, introducing, and increasing steps.

64. The method of claim 24, additionally comprising the steps of advancing the tube axially relative to the laser beam and repeating the directing, introducing, and changing steps.

65. The system of claim 39, in which the work station includes means for advancing the tube to expose another region of the tube's length.

66. The system of claim 47, in which the tube holder includes means responsive to the periodic signal for incrementally moving the tube longitudinally in the holder.

67. The system of claim 66, in which the means for varying the intensity of the laser beam turns to laser beam off during the incremental movement of the tube.

68. The system of claim 47, in which the means for varying the intensity of the laser beam rises the intensity of the laser beam continuously at a constant rate during a time interval equal toa given number of cycles of the periodic signal.

69. The system of claim 68, in which the tube holder includes means responsive to the periodic signal for incrementally moving the tube longitudinally in the holder.

70. The system of claim 69, in which the means for varying the intensity of the laser beam turns the laser beam off during the incremental movement of the tube.

71. The system of claim 55, in which the work station includes means for intermittently advancing the tube transverse to the beam scanning.

72. The system of claim 59, in which the work station includes means for intermittently advancing the tube transverse to the plane.

* * * * *

UNITED STATES PATENT AND TRADEMARK OFFICE
CERTIFICATE OF CORRECTION

PATENT NO. : 4,146,380          Page 1 of 2

DATED : March 27, 1979

INVENTOR(S) : Thomas E. Caffarella et al.

It is certified that error appears in the above-identified patent and that said Letters Patent are hereby corrected as shown below:

In the Abstract, line 5, --side-- should be inserted between "wide" and "surface".

Col. 1, line 57, "take" should be --takes--.

Col. 2, lines 1 and 2, "Summary of the Invention" should be deleted and inserted between lines 2 and 3 as a new heading.

Col. 3, line 51, "the order to 10.6" should be --the order of 10.6--.

Col. 6, line 2, "39" should be --35--.

Col. 13, line 10, "comprises" should be --comprise--;

line 58, "tionarymirror" should be --tionary mirror--;

line 65, "bein" should be --being--;

line 66, "tube in stationary" should be --tube is stationary--.

UNITED STATES PATENT AND TRADEMARK OFFICE
CERTIFICATE OF CORRECTION

PATENT NO. : 4,146,380          Page 2 of 2

DATED : March 27, 1979

INVENTOR(S) : Thomas E. Caffarella et al.

It is certified that error appears in the above-identified patent and that said Letters Patent are hereby corrected as shown below:

Col. 14, line 7, "along" should be --long--;
             line 36, "rises" should be --raises--;
             line 41, "rises" should be --raises--.

Col. 15, line 16, "system to" should be --system of--;
             line 26, "lase beam" should be --laser beam--.

Col. 16, line 29, "to" should be --the--;
             line 32, "rises" should be --raises--;
             line 34, "toa" should be --to a--.

Signed and Sealed this

Twenty-fifth Day of September 1979

[SEAL]

Attest:

LUTRELLE F. PARKER

Attesting Officer    Acting Commissioner of Patents and Trademarks